Nov. 13, 1934.   C. C. KINKER   1,980,343
CONTINUOUS ROTATION GLASS MACHINE
Filed March 10, 1930   7 Sheets-Sheet 1

Nov. 13, 1934.   C. C. KINKER   1,980,343
CONTINUOUS ROTATION GLASS MACHINE
Filed March 10, 1930   7 Sheets-Sheet 2

Patented Nov. 13, 1934

1,980,343

UNITED STATES PATENT OFFICE 1,980,343

CONTINUOUS ROTATION GLASS MACHINE

Clarence C. Kinker, Toledo, Ohio, assignor, by mesne assignments, to Owens-Illinois Glass Company, Toledo, Ohio, a corporation of Ohio Application March 10, 1930, Serial No. 434,507

8 Claims. (Cl. 49—5)

This invention relates to glass forming machines primarily of the two table type for continuous operation.

This invention has utility when incorporated in suction gather apparatus for obtaining charges to be formed into articles of blown or hollow ware.

Referring to the drawings:

Fig. 2 is a section on the line II—II, Fig. 1;

Fig. 3 is a partial plan view showing portions of the blank table or carrier of Fig. 1 and features of the blow table or carrier;

Molten glass furnace 1 is shown as having forebay 2 (Figs. 1, 2) with rim 3 and inclined bottom 4 merging back into main pool 5 of the major tank 1. This forebay 2 is covered by metallic shield 6 of thin michrome alloy, refractive against heat attack, and not responsive for having deleterious effect upon molten glass 7 as in the pool and forebay. This relatively thin metallic shield 6 has under surface 8 polished with the shield having overhang portions 9 restricting the forebay opening to arc region 10 for the gather. The effect of this shield as overhanging the glass 7 is to reflect the heat of the glass 7 into the pool and thus minimize the chilling at the gather, while restricting the region for chilling away from the edges of the forebay.

Figure 1:
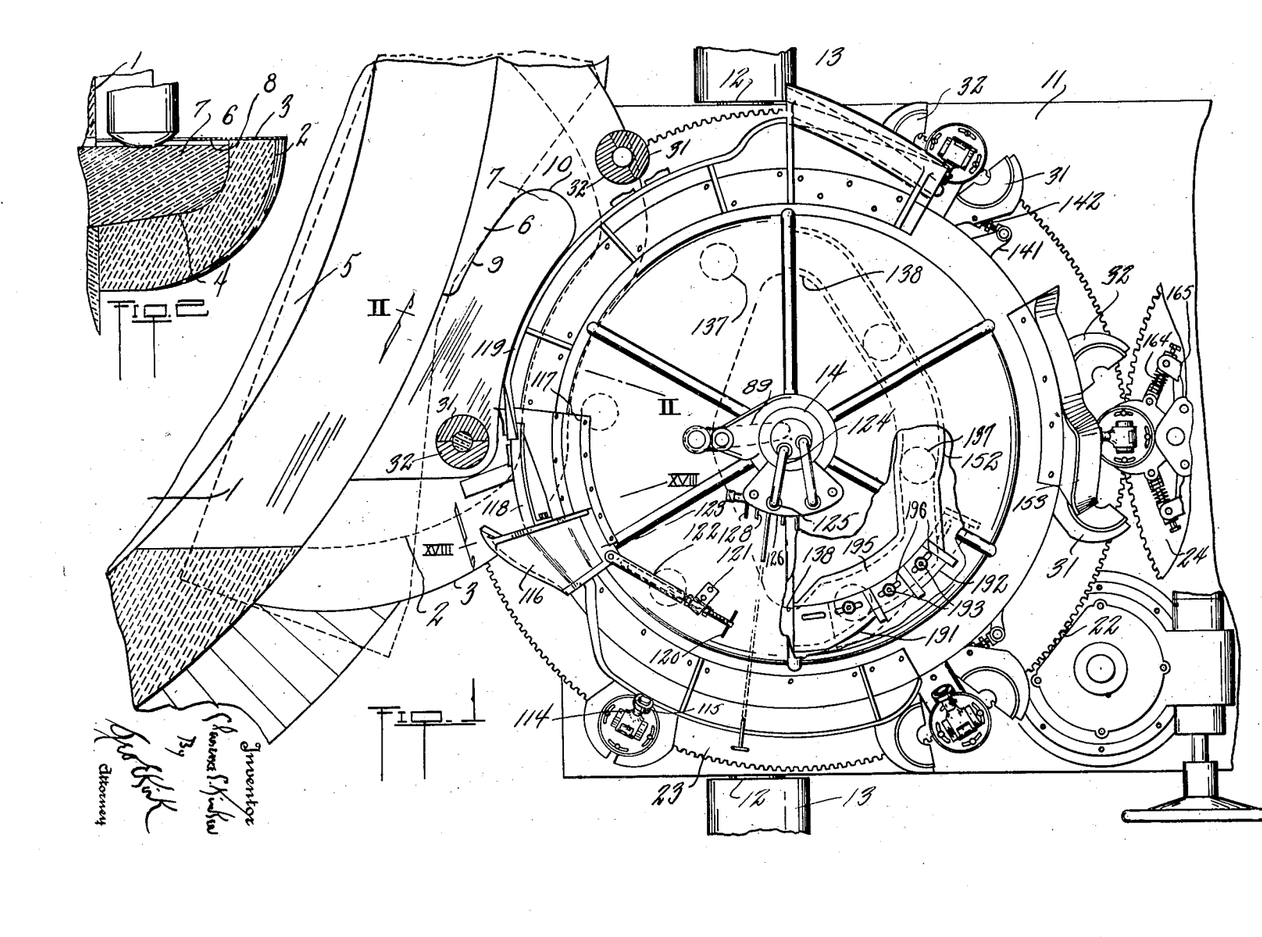
Fig. 1 is a fragmentary plan view of the gather and blank portion of the machine, parts being broken away.

The machine herein is shown as having platform 11 provided with journals 12 carrying rollers 13. Rising from this main platform 11 is blank carrier column 14 and blow carrier column 15 (Figs. 1, 3). On this platform 11 is disposed motor 16 effective, through chain 17 and shaft 18 for speed reduction through worm 19 and worm wheel 20 mounted on upright shaft 21 carried by the platform 11, to drive gear 22 in mesh with gear 23 for rotation on the blank column 14. This blank carrier gear 23 is directly in mesh with blow table or carrier gear 24.

Figures 9, 10, 11, 12, 13:
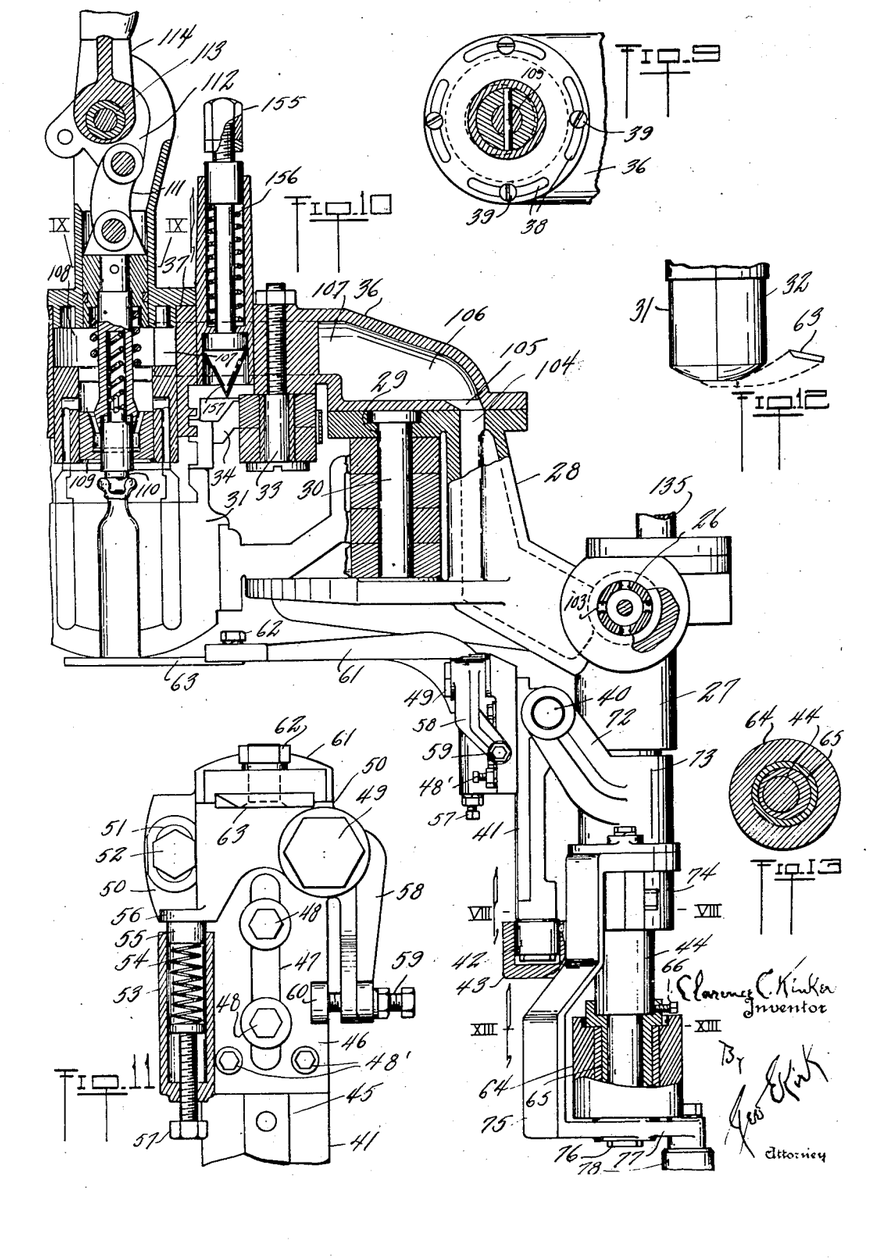
Fig. 9 is a section on the line IX—IX, Fig. 10.
Fig. 10 is a side elevation of the rocker mounting of the blank table, parts being broken away.
Fig. 11 is a detail view from the left of Fig. 10, looking at the baffle and its mounting.
Fig. 12 is a fragmentary diagrammatic detail view showing the baffle in its shear travel different closure positions for the blank mold.
Fig. 13 is a section on the line XIII—XIII, Fig. 10.
Figures 16, 17, 18:
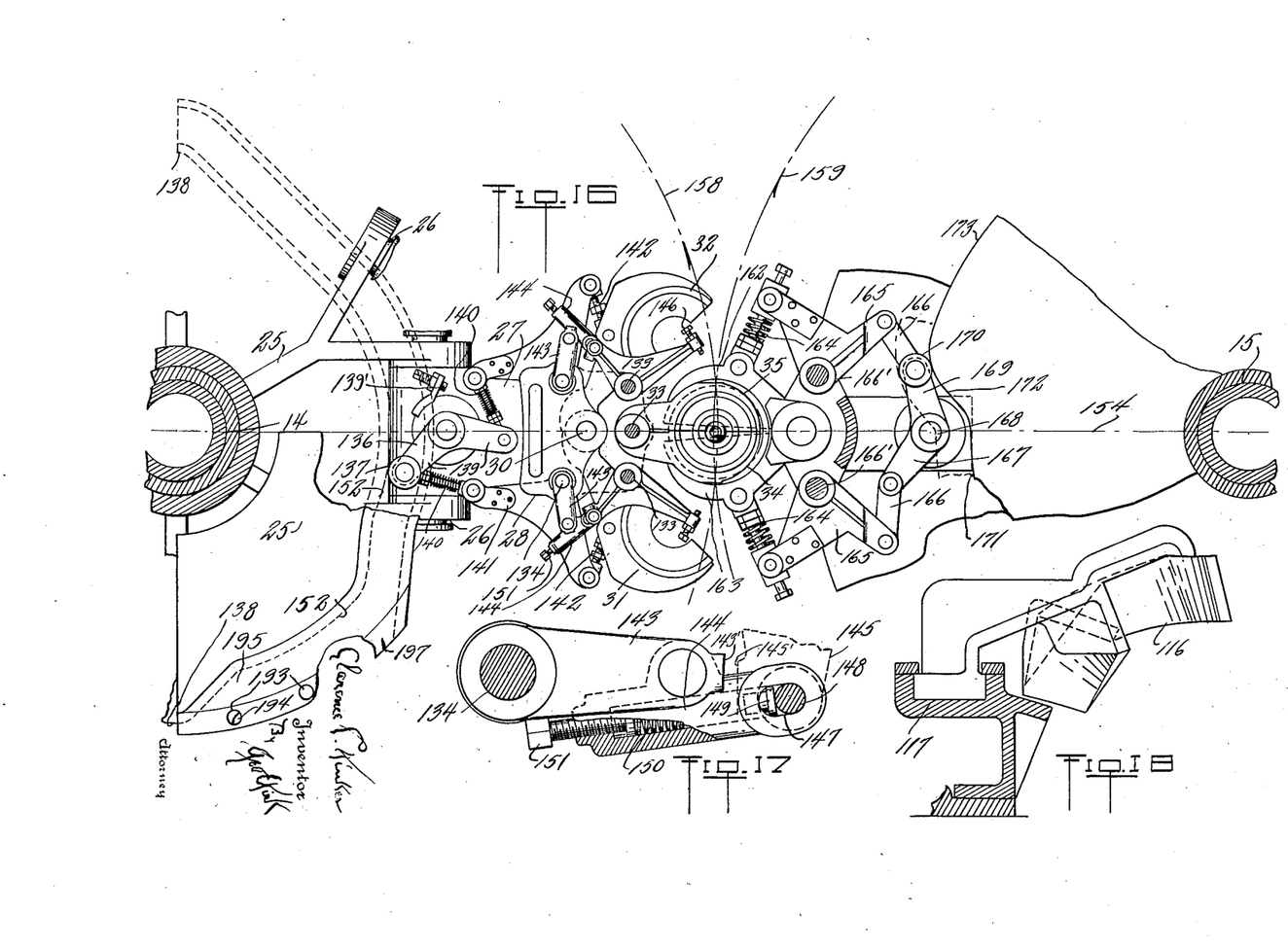
Fig. 16 is a fragmentary plan view of the transfer station position for the molds of the blank and blow carriers.
Fig. 17 is a detail view on an enlarged scale, parts being broken away, of a yieldable holding device for the neck finish opening cooperation on the blank table.
Fig. 18 is a section on the line XVIII—XVIII, Fig. 1.
Figure 19:
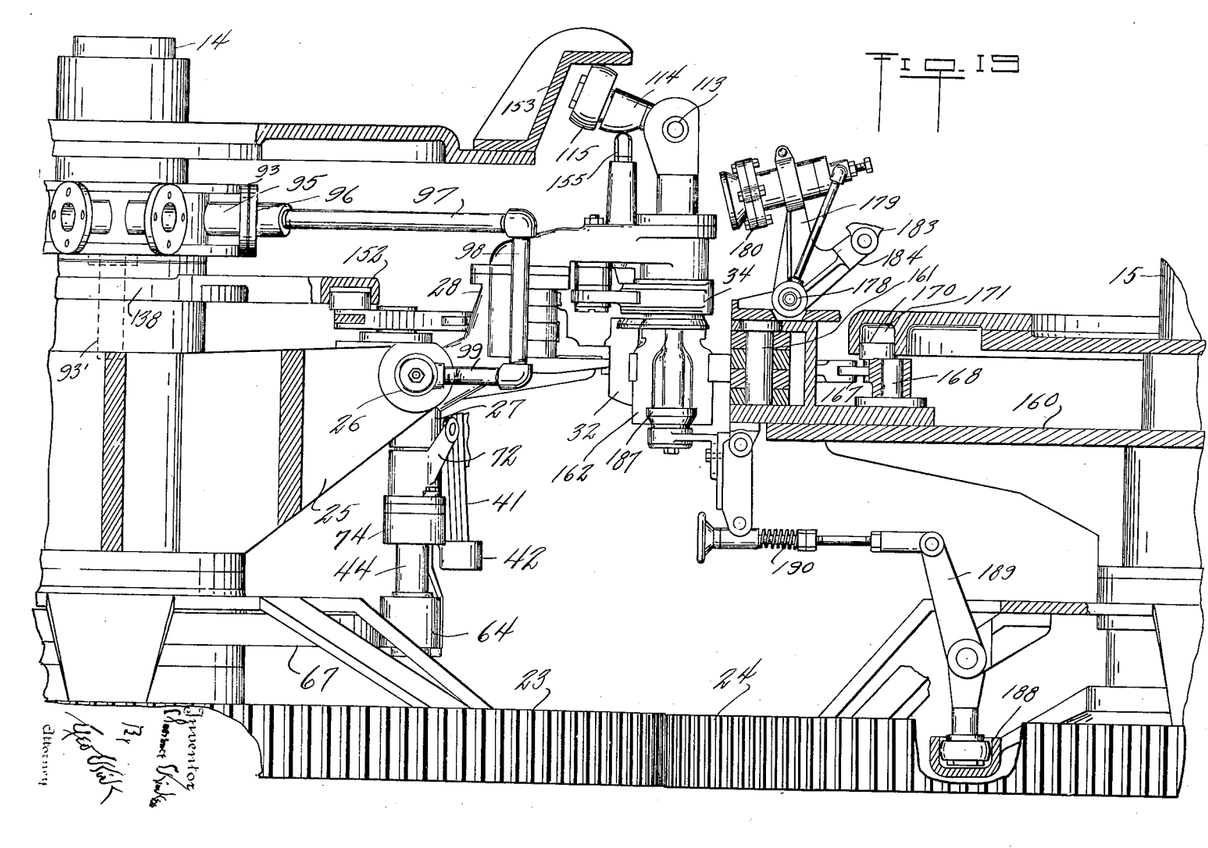
Fig. 19 is a fragmentary side elevation of the mold sections at the transfer position of Fig. 16.

The blank carrier gear 23 mounts spider 25 providing fulcrum bearings 26 for rocker mountings 27 (Figs. 10, 16, 19). Each rocker mounting 27 has upwardly and outwardly extending portion 28 providing bearing 29 for pivot pin 30 mounting major mold sections 31, 32, of the gather device. There is also pivot pin 33 providing shorter connection for neck finish mold sections 34, 35, as minor partible molds for closure in alignment above the major mold sections 31, 32. Additionally, this rocker mounting portion 28 has head section 36 extending in alignment above the closed mold sections to provide mounting for nipple box head 37 and the pin 33. This head section 37 is provided with slots 38 with which engage bolts 39 (Figs. 1, 9) whereby the nipple box head 37 may be angularly shifted relatively to the head section 36.

Figure 8:
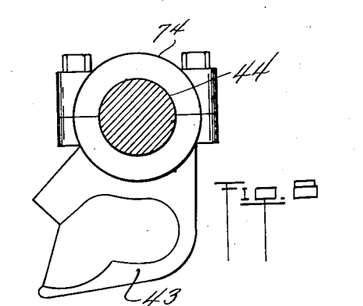
Fig. 8 is a section on the line VIII—VIII, Fig. 10.

The rocker mounting 27 has parallel to its mounting fulcrum pin 26 rocker bearing pin 40 mounting depending arm 41 terminating at roller 42 as acted upon by cam 43 (Figs. 8, 10). This cam 43 is fixedly mounted on depending stem 44 from the mounting 27. The arm 41 provides slotted guide 45 against which is mounted bracket 46 having slot 47 (Fig. 11) with bolts 48 opposed by set screws 48' for locating this bracket 46 with the arm 41. This bracket 46 has rocking bearing or fulcrum pin 49 upon which is mounted secondary arm 50 rockable relatively to the arm 41. This arm 50 is provided with slot 51. Bolt 52 therethrough limits the rocking range of this arm 50 relatively to the arm 41.

Bracket 46 mounts guide 53 carrying compression spring 54 acting on plunger 55 against shoulder 56 of the arm 50. Adjustable bolt 57 varies the compression of the spring 54 and thereby determines the thrusting resistance of the plunger 55 against the shoulder 56 in tilting of the arm 50 upward to locate as permitted by the slot 51 in rocking this arm on the fulcrum 49.

Fixed with this arm 50 is depending minor arm 58 carrying adjustable set screw 59 coacting with shoulder 60 of the bracket 46 thereby adjustably determining the upward tilt remote from the arm 50 apart from or short of the limit of the slot 51.

Offset away from the arm 41 and carried by the arm 50 is extension 61 having bolt 62 mounting blade or knife 63 as a shear and baffle coacting for cutting off gather, from the pool, as into the mold 31, 32, 34, 35, and retaining a closure position over the filled mold. The swinging of this shear or blade 63 is yieldably inclined, as determined by the spring 54, for riding under the closed mold sections 31, 32, (Fig. 12). The adjustment of the spring 54 by the bolt 57 determines the effectiveness of this action, while the location of the stop set screw 59 determines the desired horizontal, or approach to horizontal, position for the closure which the blade 63 is to assume.

For different locations of the bottom of the gather device or mold, the bracket 46 may be adjusted along the arm 41 in thus caring for different gather blank mold heights.

Figures 14, 15, 20:
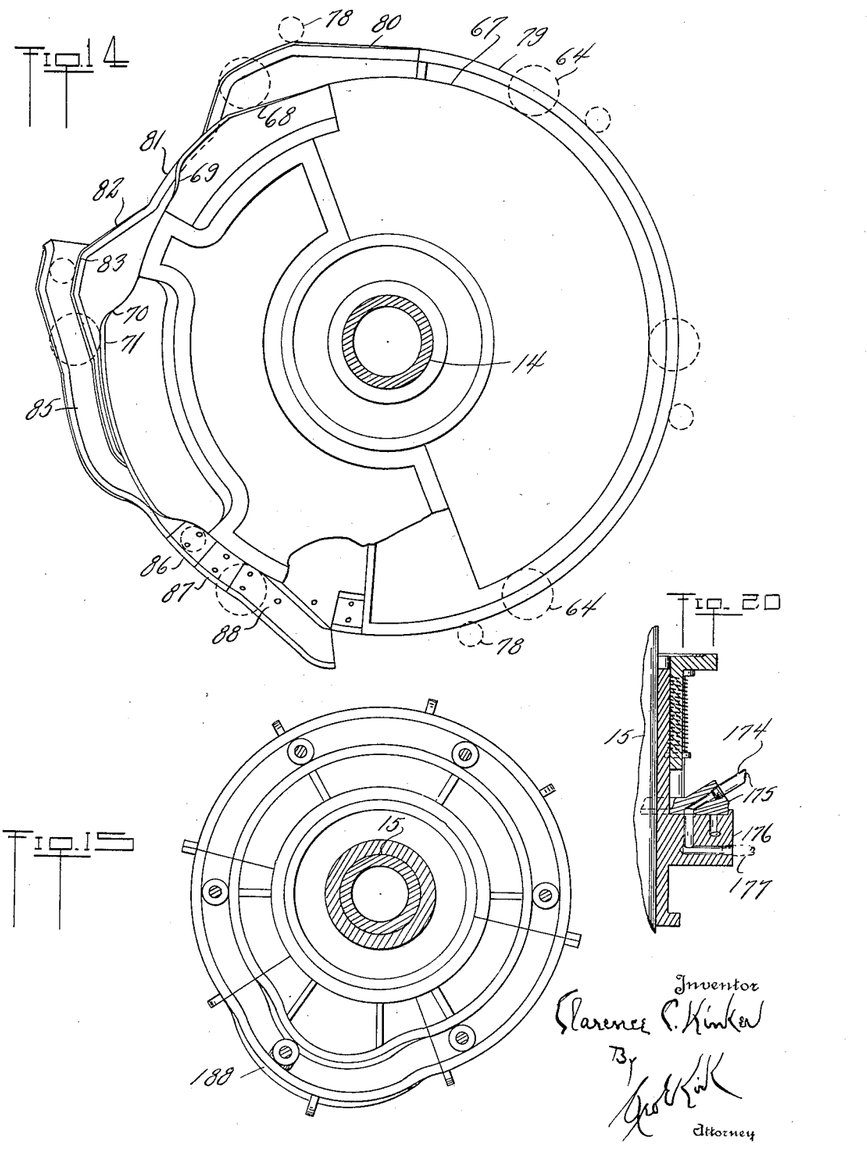
Fig. 14 is a plan view of the control cams for the blank carrier.
Fig. 15 is a plan view of the control cams for the blow carrier.
Fig. 20 is a view on the line XX—XX, Fig. 3.

The stem 44 depending from the rockable mounting 47 is shown as provided with roller 64 having eccentric bearing 65 (Fig. 13) angularly adjustable as to the stem 44 and so held by set screw 66. This roller 64 normally coacts with fixed cam 67 mounted on the column 14. In the rotation of the carrier with spider 25 carrying the rockable mountings 27, the roller 64 rides radially outward on cam section 68 (Fig. 14) in lifting the closed blank molds 31, 32, clear of the forebay rim 3. Dip or short radius section 69 then permits the closed blank mold sections 31, 32, to lower into cooperative relation with the molten glass 7 in the forebay and the continuous operation thereafter has this roller ride radially outward on cam portion 70 to region 71 to clear the forebay. The fulcrum bearing 40 is mounted in bracket 72 having bearing 73 loose on the stem 44 above mounting collar 74 as anchoring the cam 43 fixed with the stem 44.

From this bearing 73 bracket 75 depends to embrace roller 64 and is engaged by pin 76 supplementing the holding of the roller 64 in position as well as maintaining the bracket 75 for rocking on the pin 76 with the bearing 73 upon the axis as determined by the stem 44. This bracket 75 has adjacent the bolt 76 extension 77 carrying roller 78. This roller 78 is located for coacting with cam 79 (Fig. 14) adjacent the cam 67. Before the roller 64 is thrust outward by the cam portion 68, cam portion 80 thrusts, as the larger radius portion is active on the roller 78, in tilting the arm 61 carrying the baffle knife 63 in advance of the counter-clockwise rotation of the spider 25 carrying the rocking mounting 27 and blank mold or gather device 31, 32.

In the travel of the roller 64 for the dip at the forebay, the roller 78 responds at cam portion 81. Cam portion 82 directs the roller 78 for the cut off or shear movement of the blade 63 at cam portion 83 as the roller 64 rides on cam portion 71 from the cam portion 70. Clear of the forebay by directing the roller 64 for the rockable mounting, is in the vicinity of cam portion 85 retaining the blade or closure 63 at baffle position as to the closed blow mold by the cam 43.

Adjustable removable cam sections 86, 87, 88, 80 determine the clearance or swinging of the baffle 63 clear of the closure position as to the gathered charge or blank in the blank mold.

Figure 4:
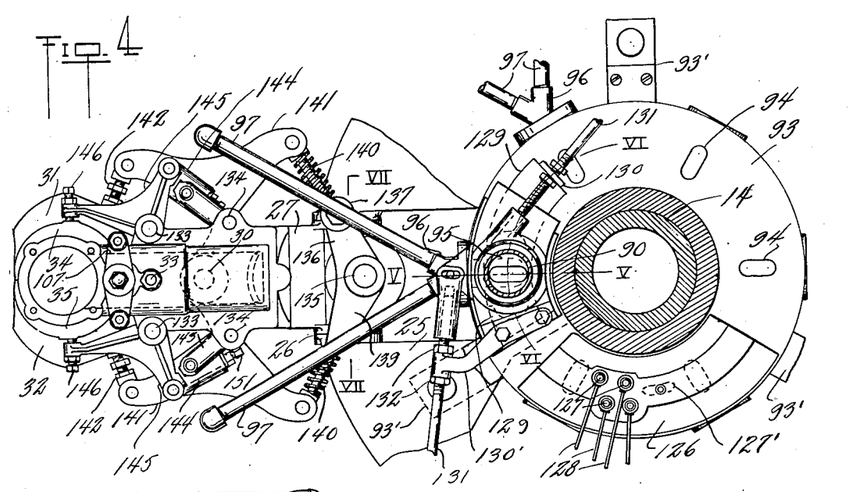
Fig. 4 is a fragmentary plan view of one of the mold sections or arms of the blank table.
Figure 5:
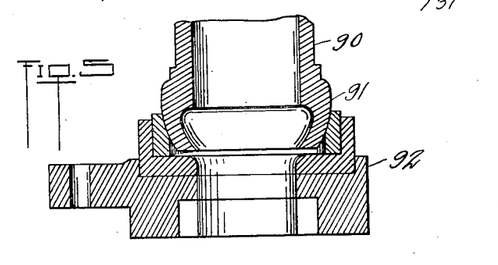
Fig. 5 is a section on the line V—V, Fig. 4.
Figure 6:
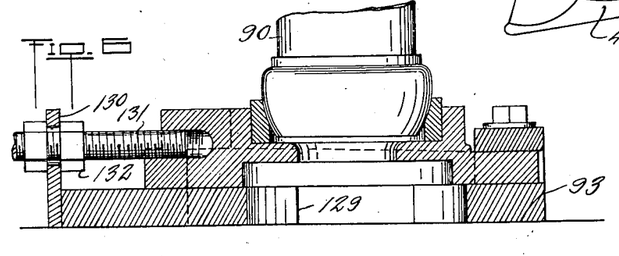
Fig. 6 is a section on the line VI—VI, Fig. 4.
Figure 7:
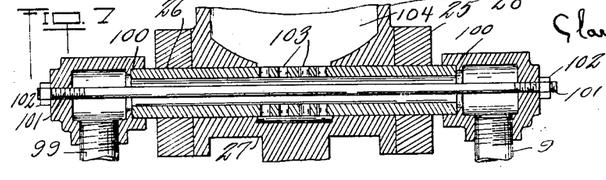
Fig. 7 is a section on the line VII—VII, Fig. 4.

Out of the hollow column 14 extends suction line 89 (Figs. 1, 4) having depending duct 90 with gland connection 91 to block 92 (Figs. 5, 6). This block 92 rides on plate 93, which is fixed by brackets 93' with the spider 25, and has ports 94. These ports 94 in the plate 93 have branch ducts 95 to Y-fittings 96 to which extend ducts 97 out to clearance position as to the devices on the mounting 27, 28, 36, with drop lines 98 (Fig. 19) therefrom to return lines 99 at terminal rotary gland connections 100 in the fulcrum bearings 26 (Figs. 7, 10). Bolts 101 through the terminal glands 100 and the hollow bearing 26 clamp these pneumatic conductor means in position by nuts 102.

The bearing 26 has lateral ports 103 directly opening into passage 104 in the riser arm 28 in communication by port 105 with passage or chamber 106 in the blow head main section 36, which latter is in communication by port 107 (Fig. 10) with chamber 108 in the nipple box about plunger 109 which may yieldably thrust plunger extension 110 into the neck finish mold sections 35, 34, and which plunger is withdrawn by link 111 connected by arm 112 to lever having fulcrum 113. From this fulcrum 113, and fixed with the arm 112, rises arm 114 (Figs. 1, 19) carrying roller 115. This fulcrum bearing 113, horizontally disposed transversely to the direction of reciprocation of the plunger 109 and thereabove, is slightly eccentric to the axis of such plunger.

From this it follows that the angular shifting of the nipple box section 37 may vary the timing to a nicety for the operation of the plunger 109 as acted upon by cam 116 (Figs. 1, 18). This cam 116 is angularly adjustable along guide 117 and has extension 118 for covering the variable clearance therefor as to cam section 119. This adjustment may occur during operation of the machine through rotation of handle 120 in bracket 121 having threaded coaction with elongated nut 122 pivotally connected to block 123 carrying cam 116, thus thrusting the block to slide in the way 117. The action of this cam 116 is for withdrawing the plunger 109 so that following the suction action as effective through the pneumatic source of duct 89, there may be pressure or blowing action from pneumatic source by way of duct 124 having connection 125 to block 126 having plurality of ports 127 controllable by independently adjustable stems 128. These determine pressure air supply in the pneumatic device for an initial puff and such degree of subsequent blowing or holding pressure air as may be desired.

Angular timing at this point is not as important as angular timing of the suction at the gather wherein adjustment to care for variation in size of ware by volume or shape may be compensated at the block 92 by auxiliary shoes 129 (Figs. 4, 6) having uprights 130, 130', through which extends screw 131 having nuts 132 thereon. This means that the clearance or timing for approach of the ports 94 as to effectiveness in the block 93 may be nicely determined not only for starting of the suction, but for cutting off the final action through rotation of the screws 131, one independent of the other and during operation of the machine.

The rocker mountings 27, 28, parallel to the axes of the pivot pins 30, 33, for the blank mold sections, are provided with fulcrum pins 133, 134, 135 (Figs. 4, 16). The fulcrum pin 135 is radially axially inward from the closed mold sections and is accordingly on a common radius from the column 14 of the fulcrum pins 30, 33. This fulcrum pin 135 has arm 136 lagging or in a clockwise direction from the fulcrum pin 135 in the counter-clockwise rotation of this spider 25.

This arm 136 terminally carries roller 137 coacting with fixed cam 138 (Figs. 1, 16) mounted on the column 14 and above the spider 25. Fixed with the arm 136 is a pair of angle lever arms 139 oppositely extending to engage adjustable compression links 140 connected to angle levers 141 mounted on the fulcrum pins 134 on opposite sides of the rockable mounting portion 28. These angle levers 141 have adjustable link connections 142 to the respective blank mold sections 31, 32. Additionally, fixed with the levers 141 (Fig. 17) are arms 143 having link connection 144 with angle levers 145 mounted on fulcrum pins 133. These arms 145 at their free ends carry adjustable stops 146 for contacting neck finish or minor mold sections 34, 35. The rocking of the arms 139 to mold closing position is against adjustable stop 139' which is just past dead center position for the links 140 and thus provides an automatic lock in such closed position.

The link 144 (Fig. 17) is shown as having slot 147 engaging pin 148 in the lever 145. This pin 148 is engaged by plunger 149 yieldably thrust against the pin 148 by spring 150 in the link 144. The compression action of this spring may be adjusted by bolt 151. It accordingly follows that as the roller 137 is effective for rocking the angle lever 139 it initiates movement through the yieldable links 140, the angle levers 141 and links 142, which, at closed position for the mold sections 34, 35, locate the pins 148 in the slots 147 toward the bolts 151. Thus the links 142 may start opening movement of the major mold sections 31, 32, while the springs 150 thrust the plungers 149 to hold the angle levers 145 so that the set screws 146 may check any tendency toward opening movement of the mold sections 34, 35, until after the mold sections 31, 32, have cleared engagement of the molten blank. Until cheek 145' is clear of cheek 143' there is positive restriction against any opening of the neck finish mold sections 34, 35.

At the region of gather, the mold sections are in closed position as determined by the cam 138. The continuous rotation of the table therefrom, involves not only shearing tail off of the gather as in the blank mold section, but holding the bottom for baffling while initial blowing of the blank occurs by way of the ports 127. Subsequent blowing, for slight distension of the blank by supplemental puff may be controlled at port 127', effective with the baffle away, for removing the shear mark on the ware.

There is reduced radius cam portion 152 (Fig. 16) for fully opening the blank mold sections 31, 32, while leaving the neck finish mold sections 34, 35, closed. The angular adjustment of the nipple box section 37 permitted by the slots 38, besides the adjustment of the plunger timing to a nicety, has the major additional utility for varying the interval of coaction of the roller 115 with cam 153 adjacent common radius line 154 between the columns 14, 15, (Figs. 1, 16, 19) for matching the seam on the ware as formed to the blow mold sections.

As approaching this line 154, the roller 115 in contact with the cam 153 rocks to strike plunger 155 and depress such plunger against the resistance of spring 156 (Figs. 10, 19) for thrusting wedge 157 downward between the arms of the neck mold sections 34, 35, as extending to the pivot pin 33 thus causing these neck finish mold sections 34, 35, to move away from each other initiating an opening position herein preferably before the line 154 is reached (Fig. 16).

Center line 158 of the closed blank molds defines an arc overlapping center line of travel 159 of the blow molds at the line 154 in providing a region of proximity, which in practice involves an overlap of as much as one-thirty second of an inch, and with such range for out-of-register there is averaged a region of up to two or three degrees on each side of this line 154 on a thirty inch radius for the arcs 158, 159.

Blow mold carrier 160 is fixed for angular rotation with the gear 24 and has arms carrying hinge pins 161 (Figs. 3, 16, 19) on which are mounted blow mold sections 162, 163. These sections 162, 163, are connected by adjustable compression yieldable links 164 with angle levers 165 mounted on fulcrum pins 166' parallel with the hinge pin 161. From the angle levers 165 extend links 166 to arms 167, 169, 169, mounted on pivot pin 168 radially inward from the pin 161 in alignment therewith as to the column 15. This arm 167 has fixed therewith arm 169 terminally carrying roller 170 coacting with fixed cam 171 on the column 15. This cam 171 has increased radius portion 172 coacting in an offset position as to the radial line from the hinge pin 161 and effective, after the blank mold has been released by the opening action of the cam 153 for depositing blank in the blow mold, for then completing closure of the blow mold and holding such blow mold closed by having the roller 170 ride on cam portion 173.

The blow table is provided with pneumatic connections 174 through the column 15 extending to have connections to block 175 and effective through plate 176 (Figs. 3, 20) for delivering pressure charge by way of duct 177 to rocking bearings 178 having arm 179 carrying blow head 180. Cam 181 is effective for acting on roller 182 extending to have yieldable link connection 183 with arm 184 fixed with the arm 179 of the blow head for thereby retracting the blow head at reduced radius cam portion 185 clear of the blown article in the blow mold so that cam portion 186 may be effective for opening the blow mold. Bottom 187 for the blow mold is then tilted downward by cam portion 188 (Fig. 15) through the medium of lever 189 and adjustable lever link 190 (Fig. 19).

In the operation hereunder, the machine is continuously rotating with the blank mold carrier traveling counter-clockwise and the blow mold table traveling clockwise. The blank mold table or carrier is effective as approaching the forebay of the pool of molten glass for rocking the closed blank mold over and into the pool for there sucking up a charge of glass, shearing the tail from such charge by the shear 63 at the open bottom closed blank mold 31, 32. This shear 63 serves as a baffle after the suction for the blank forming, which may be followed by a supplemental puff to remove the shear mark.

After the baffle has been removed, the blank mold is then opened. Before reaching the transfer station the neck mold or neck finish sections approach opening, while the blow mold sections 162, 163, have been actuated by the cam 171 approaching the region 172 to a partially closed position. Blow mold closing is completed after passing the common line 154 between the stations so that at this line the blow mold is not fully closed and the neck finish mold has started to open. The blank is thus allowed to find its center in the transfer independent of any strain upon this fragile partially-chilled neck portion.

The blowing operation then occurs in the continuous travel, with the discharge of the finished ware and the repetition of this cycle of operations for the annular series of molds upon the adjacent carriers as cooperating in the sequence herein disclosed.

The roller 137, from closed position of the blank mold sections 31, 32, is shifted from cam section 138 to mold sections fully opened position at the cam section 152 in thereby providing clearance for the blow mold to engage the blank therebetween. In practice, advantage arises in allowing the blank the short interval for cooling or adjustment of the molten glass in the blank with resultant promotion of homogeneity for the hot glass by the interval between opening of the blank mold and closing of the blow mold.

In practice, in bottle manufacture, this allows a running down from the shoulder of the molten metal for the bottles of the blank and not only permits a speeding up of production as much as over 5%, but has materially increased the volume of merchantable product. To this end, initial blank opening cam portion 191 from the cam 138 is provided with extension 192 toward and outside of the cam portion 152. Bolts 193 in openings 194 of top 195 extending from the cam 138 are thus located in slots 196 in the adjustable cam sections 191, 192, (Figs. 1, 16) which may be rotated toward or from the cam section 152 by slacking the bolts and arc shifting this section on its slide way 197. There is thus made possible an accurate determination of timing for the advance opening of the blank mold before the transfer.

What is claimed and it is desired to secure by Letters Patent is:

1. A gather device, a carrier for the device, a molten glass pool providing means in proximity to the carrier having an exposed upper surface with which the device may cooperate, a tiltable mounting for the device embodying a fulcrum fixed with the carrier, a cam directing the device for cooperation with the pool, said mounting having a roller riding on the cam, an eccentric bearing for the roller, and means for angularly shifting the bearing with the roller in position relatively to the cam for determining the rocking of the mounting, there being means operable to lock the bearing on said mounting.

2. A glass forming machine comprising a movable carrier, a blow head main section thereon, a nipple box section carried by the main section, a plunger therein, a plunger operating arm eccentrically rising therefrom, a cam for operating the arm, said nipple box section being angularly shiftable as to the main section in thereby varying the timing of the cam action thereon, and means holding said nipple box in predetermined relationship with the main section.

3. A glass forming machine comprising a movable carrier, a blow head main section thereon, a nipple box section carried by the main section, a plunger therein, a plunger operating arm eccentrically rising therefrom, said nipple box being angularly shiftable as to the main section, and a cam for operating the arm.

4. A glass forming machine comprising a movable carrier, a blow head main section thereon, an angularly adjustable nipple box section carried by the blow head main section, a pair of mold sections mounted on the carrier in cooperative relation as to the nipple box, an arm eccentrically mounted on the box rockable to open the sections, and a fixed cam for actuating the arm, the effective actuation of the arm by the cam being modified by said angular adjustment of the nipple box section.

5. A glass forming machine comprising a movable carrier, a pair of mold sections, a pivot pin hinging the mold sections in mounted position on the carrier for swinging to open and closed positions, a lever linkage system embodying three levers, fulcra for the levers parallel to the pivot pin, a fixed cam acting on the first of said three levers, a link from one arm of said first lever to the second lever, a link from the other arm of said first to the third lever, a link from the second lever to one mold section, and a link from said third lever to the other mold section for positioning the mold sections.

6. A glass forming machine comprising a movable carrier, a pair of mold sections, a pivot pin mounting the sections on the carrier, additional parallel axis pivot pins, three levers thereon, links directly between two of the levers and said sections, links from said two levers to the third lever, a fixed cam coacting with the third lever effective through the levers and links for operating the mold sections.

7. A glass forming machine comprising a pair of first mold sections, a pair of second mold sections, hinge means locating the sections for closing in forming a common mold, opening means for the first mold sections, additional opening means for the second mold sections, and interengaging means between one of said opening means for one pair of said sections and the opening means for the other pair of said sections for holding the latter sections for retarded opening, said interengaging means embodying an arm, and an adjustable yieldable link from said arm.

8. A glass forming machine comprising a first rotary carrier, a laterally eccentric second rotary carrier, sectional molds on the carriers having parallel axes, hinge pins on the respective carriers fixed against radial shifting and locating closed mold center line in glass transferring proximity along an arc adjacent a common radius between the carriers, control mechanism including means positioning the molds on the first carrier for an opening movement before reaching said common radius, and means positioning the molds on the second carrier for a closing movement incomplete at reaching said common radius, and driving means for continuously rotating said carriers in effecting release of glass from a mold in the first carriers to be received by a mold in the second carrier during said continuous rotation of the carriers.

CLARENCE C. KINKER.

CERTIFICATE OF CORRECTION.

Patent No. 1,980,343. November 13, 1934.

CLARENCE C. KINKER.

It is hereby certified that error appears in the printed specification of the above numbered patent requiring correction as follows: Page 4, strike out lines 127 to 144 inclusive, comprising claim 8; and that the said Letters Patent should be read with this correction therein that the same may conform to the record of the case in the Patent Office.

Signed and sealed this 8th day of January, A. D. 1935.

(Seal)

Leslie Frazer
Acting Commissioner of Patents.